United States Patent
Xu et al.

(10) Patent No.: US 9,642,148 B2
(45) Date of Patent: May 2, 2017

(54) INTERFERENCE CANCELLATION BASED ON ADAPTIVE TIME DIVISION DUPLEXING (TDD) CONFIGURATIONS

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US); Stefan Geirhofer, San Diego, CA (US); Yongbin Wei, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 280 days.

(21) Appl. No.: 13/873,112

(22) Filed: Apr. 29, 2013

(65) Prior Publication Data

US 2013/0294268 A1    Nov. 7, 2013

Related U.S. Application Data

(60) Provisional application No. 61/641,211, filed on May 1, 2012.

(51) Int. Cl.
*H04W 72/08* (2009.01)
*H04W 52/24* (2009.01)

(52) U.S. Cl.
CPC ........ *H04W 72/082* (2013.01); *H04W 52/243* (2013.01)

(58) Field of Classification Search
CPC ........... H04W 72/082; H04W 72/0426; H04W 52/243; H04W 52/143; H04W 52/325; H04W 72/005; H04W 72/042; H04L 1/0027
See application file for complete search history.

(56) References Cited

U.S. PATENT DOCUMENTS

| 2003/0194969 | A1 | 10/2003 | Pan |
| 2009/0231989 | A1* | 9/2009 | Larsson et al. ............... 370/201 |
| 2010/0220597 | A1 | 9/2010 | Ji et al. |
| 2010/0254335 | A1 | 10/2010 | Koo et al. |
| 2011/0195704 | A1* | 8/2011 | Choi ................ H04W 72/1263 455/423 |
| 2011/0211503 | A1 | 9/2011 | Che et al. |

(Continued)

FOREIGN PATENT DOCUMENTS

WO    2011162656 A1    12/2011

OTHER PUBLICATIONS

International Search Report and Written Opinion—PCT/US2013/038924—ISA/EPO—Sep. 2, 2013.

(Continued)

*Primary Examiner* — Awet Haile
(74) *Attorney, Agent, or Firm* — Seyfarth Shaw LLP

(57) ABSTRACT

A method for mitigating interference in a wireless network includes an eNodeB and/or a UE identifying interference. The eNodeB may identify the interfering TDD configurations based on a downlink signal of a neighboring eNodeB received during an uplink timeslot for a UE associated with the eNodeB. Likewise, the UE may identify an interfering UE based on an uplink signal received during a downlink timeslot for an eNodeB associated with the UE. The eNodeB performs interference management based at least in part on the identified interference.

14 Claims, 18 Drawing Sheets

(56) References Cited

U.S. PATENT DOCUMENTS

| | | |
|---|---|---|
| 2011/0250919 A1 | 10/2011 | Barbieri et al. |
| 2011/0306350 A1 | 12/2011 | Barbieri et al. |
| 2012/0082038 A1 | 4/2012 | Xu et al. |
| 2012/0106388 A1 | 5/2012 | Shimezawa et al. |
| 2012/0331478 A1 | 12/2012 | Zhu et al. |
| 2013/0094387 A1* | 4/2013 | Susitaival et al. ............ 370/252 |
| 2013/0308503 A1* | 11/2013 | Kim ...................... H04L 5/0053 370/280 |
| 2014/0160967 A1 | 6/2014 | Gao et al. |

OTHER PUBLICATIONS

Lee, H., et al., "Combination of Dynamic-TDD and Static-TDD Based on Adaptive Power Control", IEEE 68th Vehicular Technology Conference (VTC), Sep. 21, 2008, IEEE, Piscataway, NJ, USA, pp. 1-5, XP031352570, ISBN: 978-1-4244-1721-6, the whole document.

LG Electronics: "Performance of C RE and resource specific CSI", 3GPP Draft; R1-106145 CRE and Resource Specific CSI, 3rd Generation Partnership Project (3GPP), Mobile Competence Centre; 650, Route Des Lucioles ; F-06921 Sophia-Antipolis Cedex ; France, vol. RAN WG1, No. Jacksonville, USA; Nov. 15, 2010, Nov. 9, 2010 (Nov. 9, 2010), XP050489604.

Mediatek Inc: "Collision Handling for Periodic CSI Reporting in Subframe Subsets", 3GPP Draft; 1-110142 Collision Handling for Periodic CSI Reporting, 3rd Generation Partnership Project (3GPP), Mobile Competence Centre ; 650, Route Des Lucioles ; F-06921 Sophia-Antipolis Cedex ; France, vol. RAN WG1, No. Dublin, Ireland; Jan. 17, 2011, Jan. 12, 2011 (Jan. 12, 2011), XP050490315, [retrieved on Jan. 12, 2011].

Partial International Search Report—PCT/US2013/038924—International Search Authority European Patent Office Jul. 24, 2013.

* cited by examiner

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 7

INTERFERENCE CANCELLATION BASED ON ADAPTIVE TIME DIVISION DUPLEXING (TDD) CONFIGURATIONS

CROSS-REFERENCE TO RELATED APPLICATION

This application claims the benefit under 35 U.S.C. §119(e) to U.S. Provisional Patent Application No. 61/641,211 entitled "ANCHOR SUBFRAME ADAPTIVE TDD," filed on May 1, 2012, the disclosure of which is expressly incorporated by reference herein in its entirety.

BACKGROUND

Field

Aspects of the present disclosure relate generally to wireless communication systems, and more particularly to adjusting downlink/uplink communications based on the time division duplexing (TDD) configurations of serving cells and neighbor cells.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

SUMMARY

According to an aspect of the present disclosure, a method mitigates interference in a wireless Time Division Duplex (TDD) network environment. The method includes an eNodeB and/or a UE identifying interference on subframes configured for mismatched uplink and downlink transmissions. The eNodeB may identify the interfering TDD configurations based on a downlink signal of a neighboring eNodeB received during an uplink timeslot for a UE associated with the eNodeB. Likewise, the UE may identify an interfering UE based on an uplink signal received during a downlink timeslot for an eNodeB associated with the UE. The eNodeB performs interference management based at least in part on the identified interference. In one configuration, the interference management may include specifying different scheduling and/or power control for subframes that are mismatched based on the interfering TDD configuration. In another configuration, the interference management may include cancelling the interfering downlink signal or the interfering uplink signal.

In one aspect of the present disclosure, a method of wireless communication is disclosed. The method includes identifying an interfering TDD configuration, and interference resulting from a mismatch between an uplink communication of a first base station and a downlink communication of a second base station. The method also includes performing interference management based at least in part on the identified interfering TDD configuration.

Another aspect of the present disclosure discloses an apparatus including means for identifying an interfering TDD configuration, and interference resulting from a mismatch between an uplink communication of a first base station and a downlink communication of a second base station. The apparatus also includes means for performing interference management based at least in part on the identified interfering TDD configuration In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of identifying an interfering TDD configuration, and interference resulting from a mismatch between an uplink communication of a first base station and a downlink communication of a second base station. The program code also causes the processor(s) to perform interference management based at least in part on the identified interfering TDD configuration.

Another aspect of the present disclosure discloses a wireless communication apparatus having a memory and at least one processor coupled to the memory. The processor(s) is configured to identify an interfering TDD configuration, and interference resulting from a mismatch between an uplink communication of a first base station and a downlink communication of a second base station. The processor(s) is further configured to perform interference management based at least in part on the identified interfering TDD configuration.

In one aspect of the present disclosure, a method of wireless communication is disclosed. The method includes measuring, by a UE, uplink interference in a downlink subframe of the UE. The method also includes reporting the uplink interference to an eNodeB.

Another aspect of the present disclosure discloses an apparatus including means for measuring, by a UE, uplink interference in a downlink subframe of the UE. The apparatus also includes means for reporting the uplink interference to an eNodeB.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of measuring, by a UE, uplink interference in a downlink subframe of the UE. The program code also causes the processor(s) to report the uplink interference to an eNodeB.

Another aspect of the present disclosure discloses a wireless communication apparatus having a memory and at least one processor coupled to the memory. The processor(s) is configured to measure, by a UE, uplink interference in a downlink subframe of the UE. The processor(s) is also configured to report the uplink interference to an eNodeB.

In one aspect of the present disclosure, a method of wireless communication is disclosed. The method includes defining an anchor set of subframes that are common across uplink configurations and downlink configurations. The method also includes defining a non-anchor set of subframes that are potentially not common across different uplink configurations and downlink configurations. The method further includes signaling the anchor set, and/or the non-anchor set to at least one UE.

Another aspect of the present disclosure discloses an apparatus including means for defining an anchor set of subframes that are common across uplink configurations and downlink configurations. The apparatus also includes means for defining a non-anchor set of subframes that are potentially not common across different uplink configurations and downlink configurations. The apparatus further includes means for signaling the anchor set, and/or the non-anchor set to at least one UE.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of defining an anchor set of subframes that are common across uplink configurations and downlink configurations. The program code also causes the processor(s) to define a non-anchor set of subframes that are potentially not common across different uplink configurations and downlink configurations. The program code further causes the processor(s) to signal the anchor set, and/or the non-anchor set, to at least one UE.

Another aspect of the present disclosure discloses a wireless communication apparatus having a memory and at least one processor coupled to the memory. The processor(s) is configured to define an anchor set of subframes that are common across uplink configurations and downlink configurations. The processor(s) is also configured to define a non-anchor set of subframes that are potentially not common across different uplink configurations and downlink configurations. The processor(s) is further configured to signal the anchor set, and/or the non-anchor set to at least one UE.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIG. 7 is a block diagram illustrating uplink-downlink subframe configurations in an LTE network.

DETAILED DESCRIPTION

Figure 1:
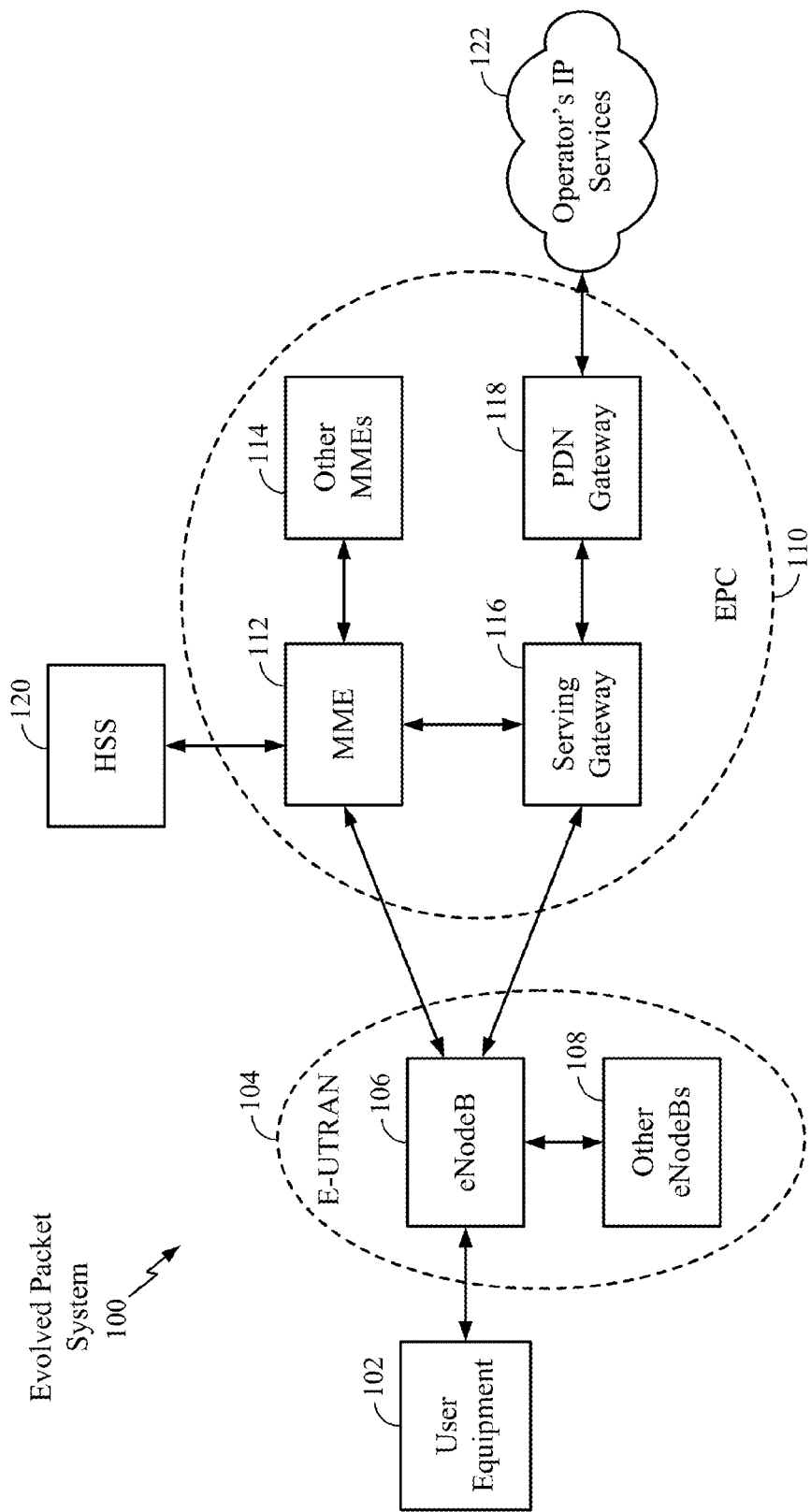
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol transmissions toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS).

Figure 2:
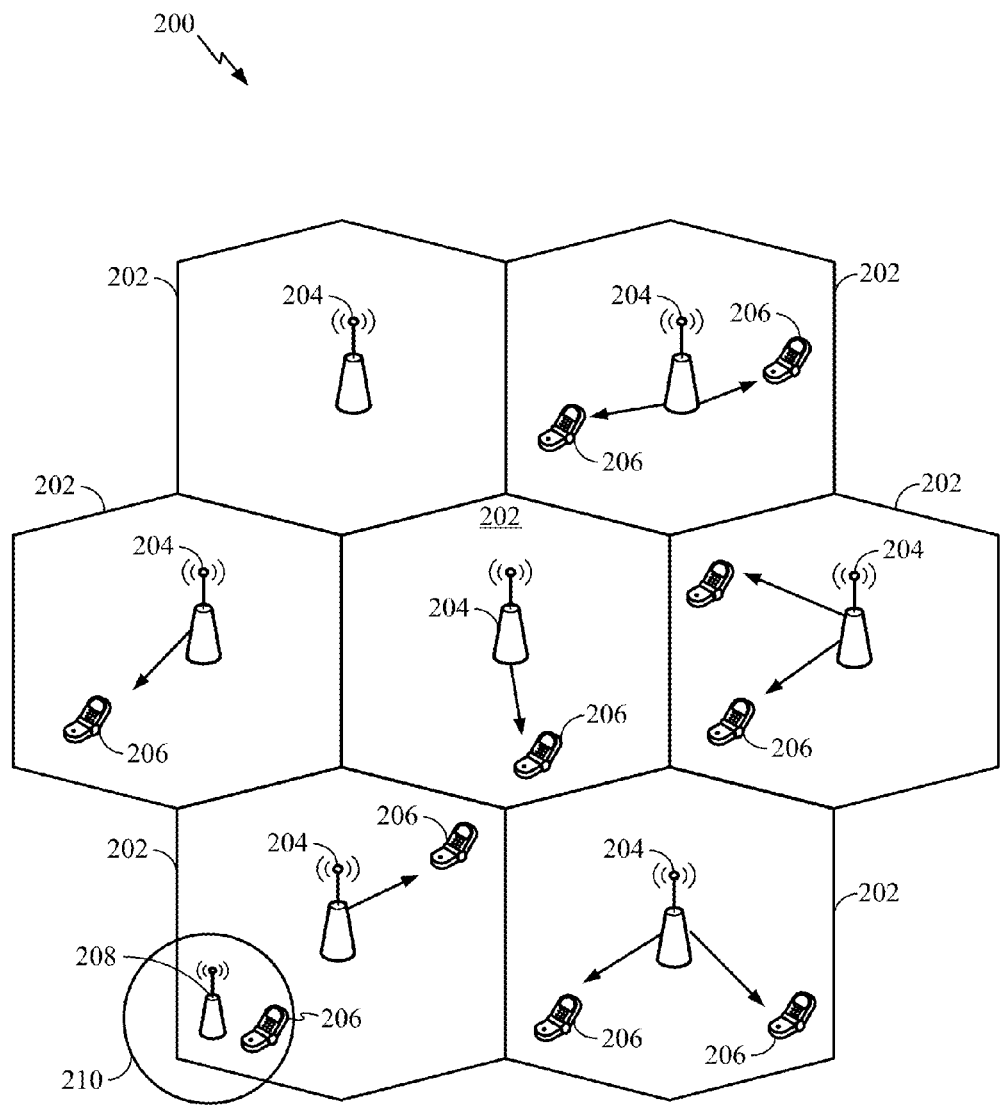
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
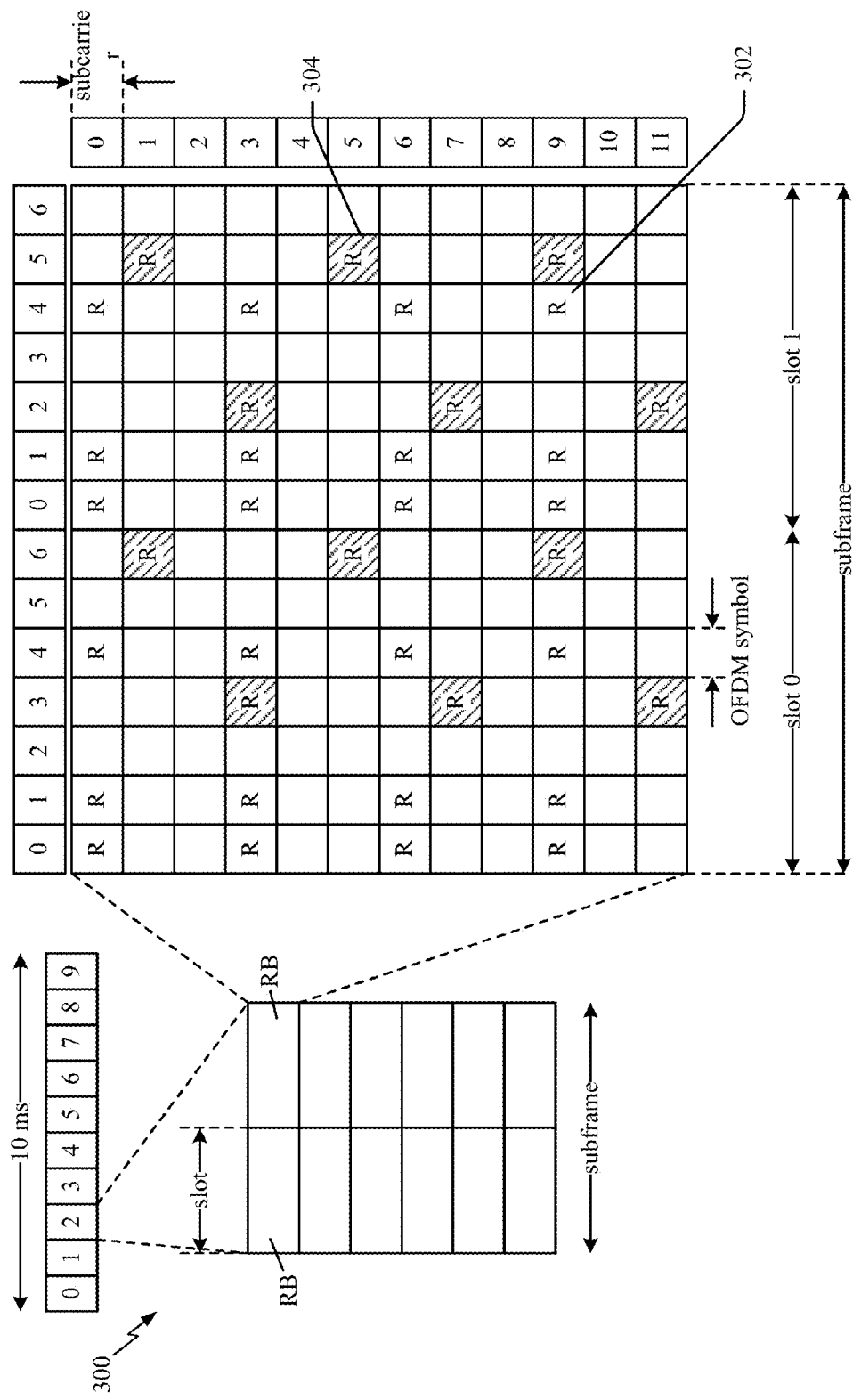
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
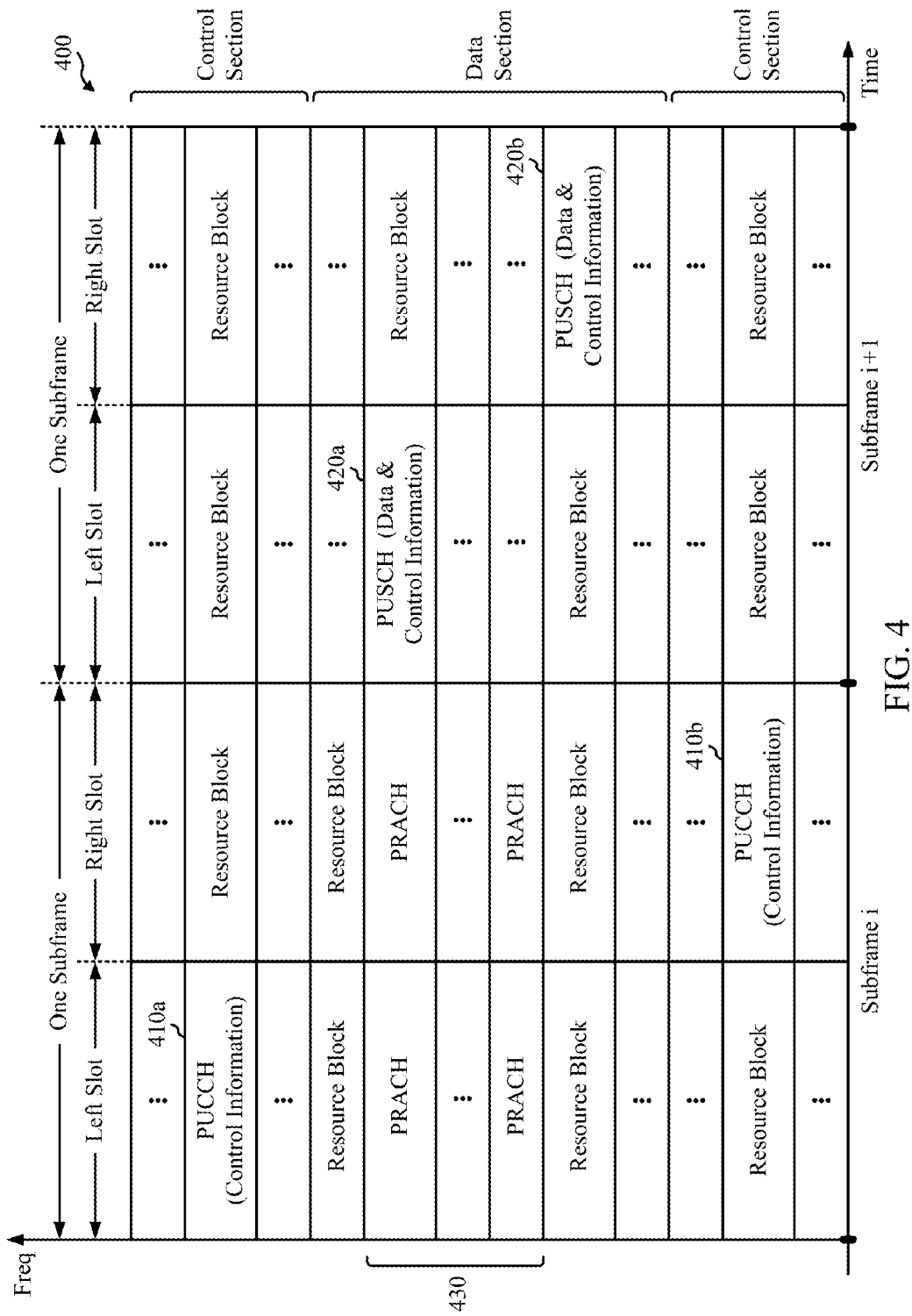
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
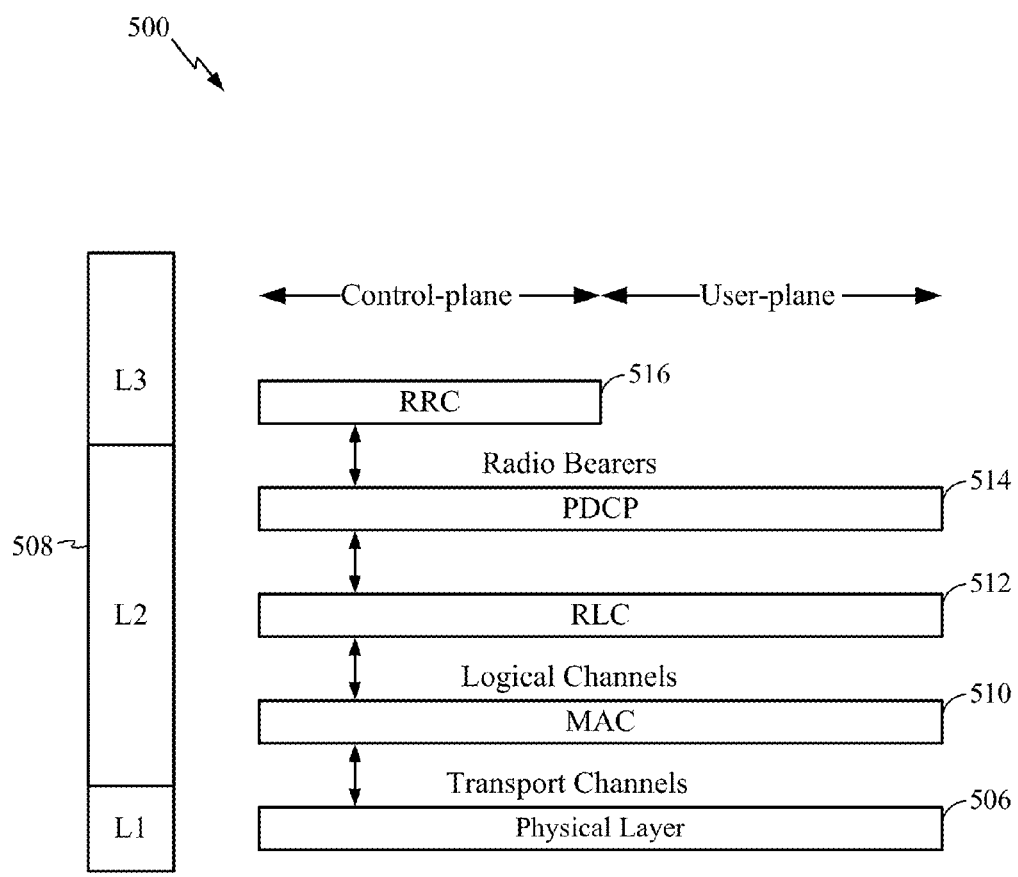
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
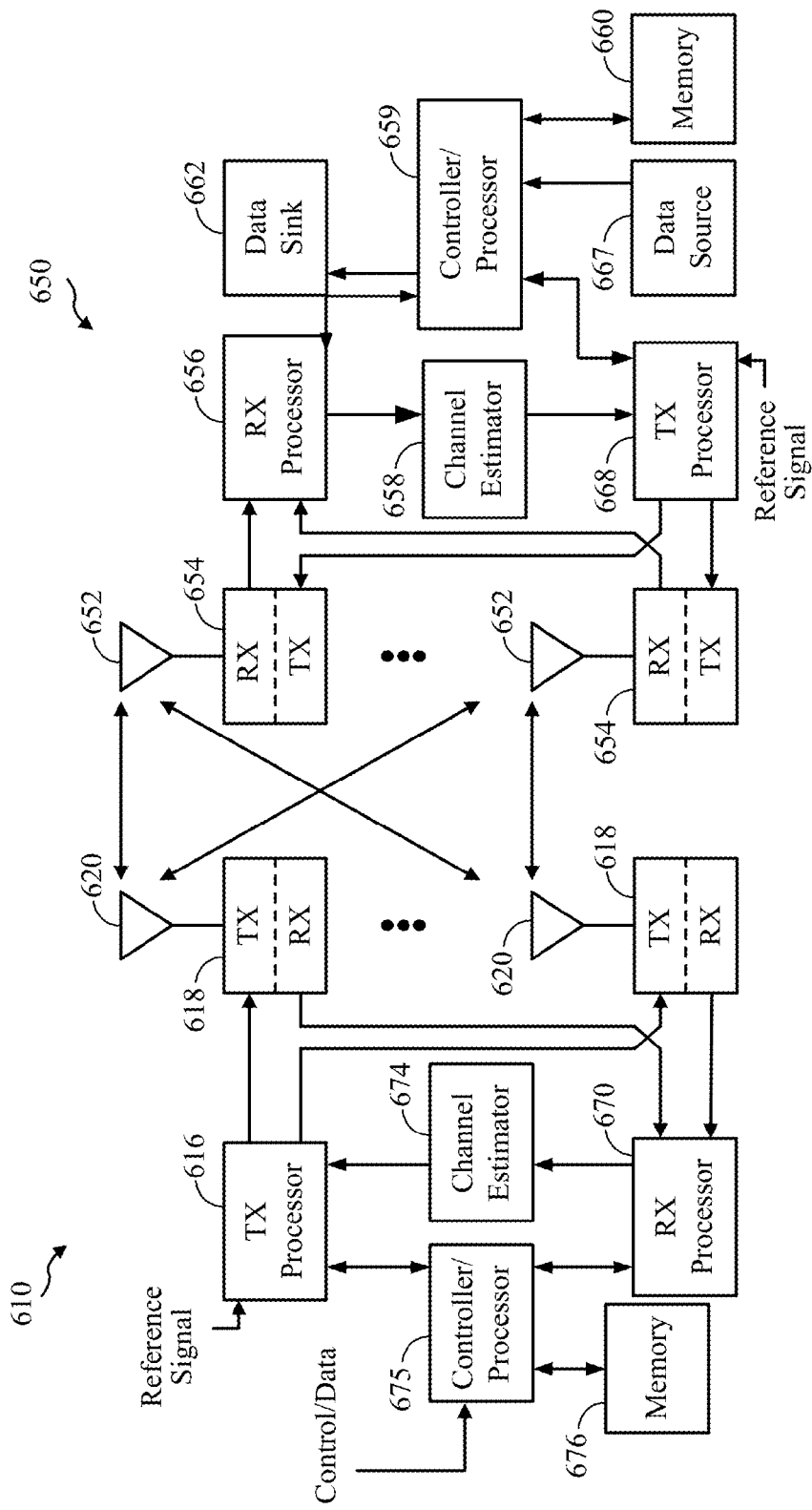
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Adaptive TDD Configurations

One aspect of the present disclosure is directed to adjusting downlink/uplink communications based on the time division duplexing (TDD) configurations of serving cells and neighbor cells. Additionally, aspects of the present disclosure are directed to mitigating eNodeB to eNodeB interference and/or UE to UE interference. Furthermore, aspects of the present disclosure are also directed to improving a transition from one TDD configuration to another TDD configuration.

FIG. 7 illustrates different TDD subframe configurations for LTE TDD systems. The different subframe configurations specify different downlink (DL) and uplink (UL) resource allocations. For example, configuration 0 includes a downlink subframe at sub frame 0, a special subframe at sub frame 1, uplink subframes at subframes 2-4, a downlink subframe for subframe 5, another special subframe at subframe 6, and uplink subframes at subframes 7-9.

Compared with FDD systems, where the downlink and uplink resources are split across frequency, the TDD configurations illustrated in FIG. 7 may provide additional gain when the downlink load and the uplink load vary. The following description includes adaptive uplink/downlink subframe configurations, which can be applied in a TDD network. Those skilled in the art will understand that special subframes may also be adaptive.

The TDD configurations may provide adaptation for downlink and/or uplink resource allocation according to the cell loading. For example, adaptive TDD configurations may increase the gain for bursty traffic in single cell networks. Additionally, adaptive TDD configurations may reduce transmission overhead when a cell is lightly loaded.

Interference based on the TDD configurations may include same operator or different operator scenarios. In particular, for the same operator scenarios, adjacent cells may experience interference from each other when the adjacent cells have different TDD configurations. Additionally, if different operators use different TDD configurations, then the TDD configurations may be different in the macro cell boundary region.

Figure 8:
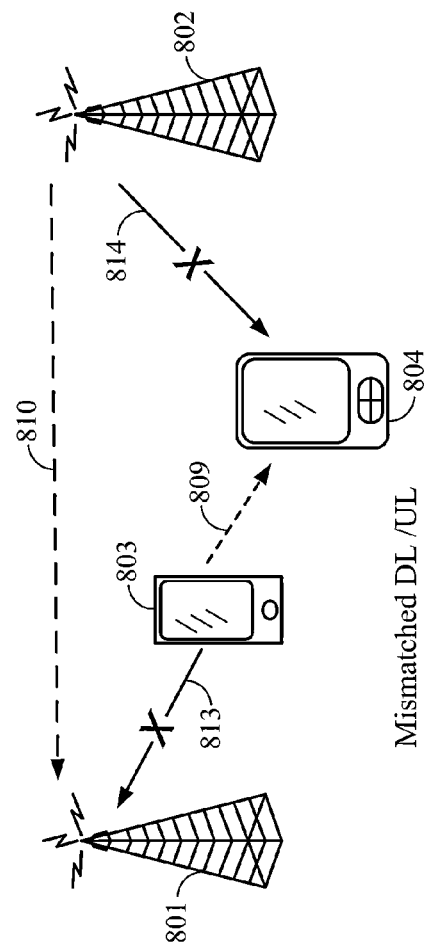
FIG. 8 is a block diagram illustrating examples various interference scenarios.

In other cases, when pico cells are deployed, such as deployment in a hot spot, the traffic conditions may be different from the macro cell or another pico cell. Moreover, in some cases, the TDD configurations between pico cells and/or pico to macro cells may be different. Additionally, in some cases, the hotspots may have different configurations. Moreover, different TDD configurations may be applied to different carriers. For example, in some carriers, the frequency separation of adjacent carriers may be 2.5 MHz FIG. 8 illustrates an example of a system having a first eNodeB 801 and a second eNodeB 802. As shown in FIG. 8, a first UE 803 may attempt to communicate with the first eNodeB 801, and similarly, a second UE 804 may attempt to communicate with the second eNodeB 802. The first eNodeB 801 may communicate according to TDD configuration 1 and the second eNodeB 802 may communicate according to TDD configuration 2. Subframes (SF) 0-4 of TDD configurations 1 and 2 are illustrated in FIG. 8. In this example, interference occurs at subframe 3.

That is, in an exemplary illustration of eNodeB to eNodeB interference, the first eNodeB 801 expects to receive an uplink signal 813 from the first UE 803. However, because the second eNodeB 802 transmits at the same band as the first eNodeB 801, the downlink signal of the second eNodeB 802 may cause interference 810 during the uplink timeslot of the first eNodeB 801. The interference 810 may affect the first eNodeB's ability to receive the uplink signal 813.

In an example of UE-to-UE interference, the second UE 804 expects a downlink transmission 814 from the second eNodeB 802 while the first UE 803 is attempting to transmit an uplink signal 813 to the first eNodeB 801. The uplink signal 813 of the first UE 803 may cause interference 809 to the downlink reception of the second UE 804. The interference could be large if the UEs are near each other.

Implementation based solutions for interference management may be applied to address transition issues. In one configuration, interference avoidance may be specified for semi-static TDD configurations. That is, the eNodeB or UE may attempt to detect a particular TDD configuration and adjust a transmission schedule to mitigate and/or prevent the interference. More specifically, the eNodeB and/or UE may determine which subframes may potentially mismatch with the adjacent eNodeB and/or UE based on the seven uplink/downlink configurations. The eNodeB and/or UE may detect the TDD configuration when the TDD configuration is semi-static (e.g., not rapidly changing).

In one configuration, an eNodeB identifies the configuration from the interfering eNodeB by detecting the downlink signal of an interfering eNodeB during an uplink reception time of a UE associated with the eNodeB. That is, a eNodeB may receive a downlink transmission from an adjacent eNodeB during a time period when the eNodeB is expecting an uplink signal. Thus, the eNodeB may identify the uplink/downlink configuration from the adjacent eNodeB based on the received downlink transmission. In some cases, the received downlink transmission may be considered an interference signal. The eNodeB may manage the mismatch after the mismatch has been detected.

In one configuration, the eNodeB may use energy detection of the common reference signal (CRS) tones or channel state information reference signal (CSI-RS) tones to identify the mismatched subframes in terms of uplink/downlink configuration. In the present configuration, the CSI-RS tones may identify the mismatched subframes if the CSI-RS tones are uniquely mapped to a low power node. The eNodeB may treat the mismatched subframes with different scheduling, modulation and coding schemes (MCS), and/or power control.

In another configuration, a UE may identify neighbor UEs based on a neighbor UE's uplink signal. After detecting a neighbor UE, the UE may signal the network to indicate identified interference and/or the presence of the neighbor UE. The impact of the interference on sounding reference signals (SRSs), uplink control channels, and random access channels may be limited. Specifically, the sounding reference signal is confined within the last symbol of each subframe, the uplink control channel is within one resource block (RB), and the random access channel is sparse. Therefore, the impact of the interference on the aforementioned channels may be limited. Still, in one configuration, when the main interference source is a shared uplink channel, the interference may be mitigated by a scheduler. That is, a schedule of the UE or interfering neighbor UE may be changed to mitigate the potential interference.

In one configuration an eNodeB may apply enhanced inter-cell interference coordination (eICIC) mechanisms for interference management. In particular, an eNodeB may identify different subframe configurations via interference signal detection, and/or information received from an interface between eNodeBs (e.g., X2 interface or fiber interface).

After identifying the different subframe configurations, the eNodeB my schedule UEs to report dual channel state information (CSI) reports. Specifically, some subframes may have interference and some the subframes may not be affected by interference. Therefore, two different CSI reports may be scheduled. A first report may be scheduled to report clean CSI on the subframes that do not collide with other TDD configurations. Additionally, a second report may be specified for unclean CSI on the subframes that potentially collide with other TDD configurations. Based on the reports, the eNodeB may identify the UEs that experience interference from other UEs. Additionally, the eNodeB may schedule the identified UEs to a resource (e.g., frequency/time) to avoid interference.

Another configuration of the interference cancellation scheme may be applied when an orthogonal frequency division multiplexing (OFDM) signal is canceled from single carrier frequency division multiplexing (SC-FDM) signal or vice versa. The typical UE interference cancellation schemes focus on cancelling an interfering uplink signal to detect another uplink signal or canceling the interfering downlink portion from a different downlink signal. In one aspect of the present disclosure, for adaptive TDD configurations, the UE cancels the uplink signal (e.g., PUSCH, PUCCH, PRACH, and/or SRS) to detect a downlink signal (e.g., CRS, PDCCH, and/or PDSCH).

In another configuration, for adaptive TDD configurations, the eNodeB cancels the downlink signal (e.g., PBCH, CRS, PDCCH, and/or PDSCH) to detect an uplink signal (e.g., PUSCH, PUCCH, PRACH, and/or SRS). The PSS and SSS are not cancelled because they are typically aligned because they are on subframes that are common across the configurations. Because some of these signals are in known time/frequency locations, the cancellations for these signals are relatively easier if configurations can be exchanged via an X2 interface or fiber connection. Given the known interference tones (e.g., from CRS), the eNodeB may perform the appropriate log likelihood ration (LLR) scaling to account for the punctured tones by these signals.

Another aspect of the present disclosure is directed to anchor subframe based design. Referring back to the TDD configurations of FIG. 7, four of the subframes are aligned among all subframes (i.e., subframes 0, 1, 2 and 5). In addition, in subframe 6, the downlink transmissions are partially aligned. The subframes that align (i.e., the subframes that do not change across configurations) may also be referred to as the anchor subframes.

In one configuration, the adaptive TDD configurations may be improved based on the anchor subframes. Furthermore, another aspect of the present disclosure is directed to reducing signaling as well as hybrid automatic repeat request (HARD) timeline changes. Additionally, if only some configurations are allowed, (e.g., configurations 1 and 2), then the anchor subframes can be further extended to eight subframes.

Figure 9A:
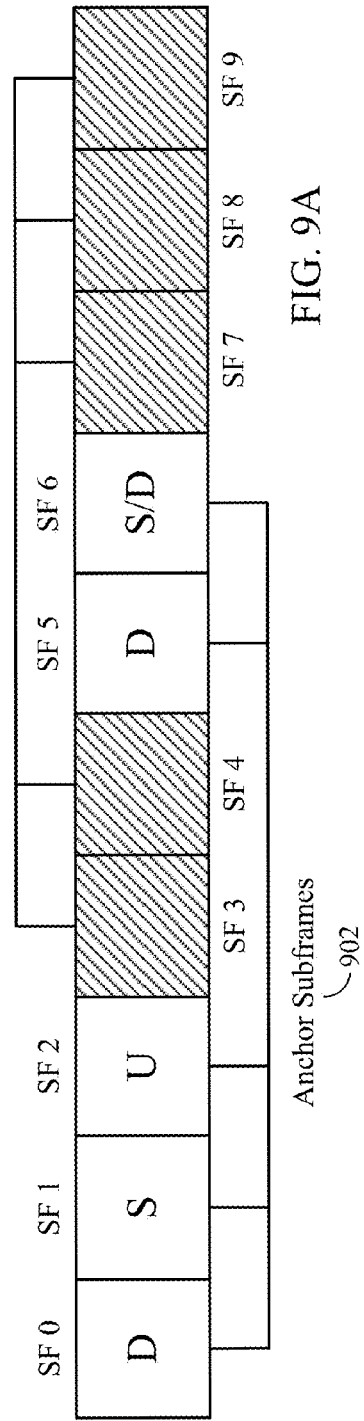
FIGS. 9A and 9B illustrate examples of anchor subframe configurations and non-anchor subframe configurations according to an aspect of the present disclosure.
Figure 9B:
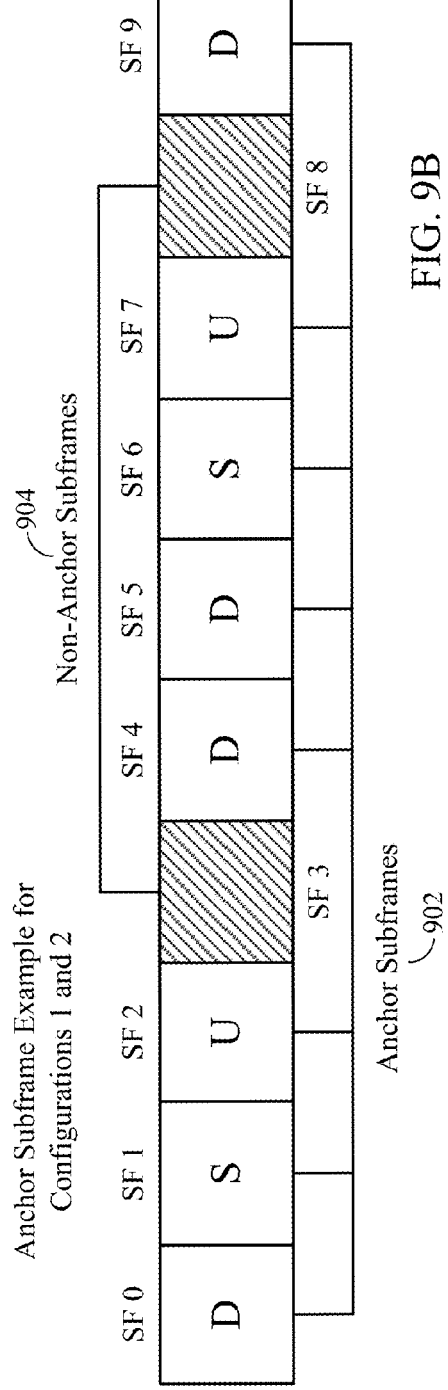

Examples of anchor subframes are illustrated in FIGS. 9A and 9B. FIG. 9A illustrates the anchor subframes 902 across all seven of the TDD configurations. Specifically, anchor subframes 902 may include subframes 0, 1, 2 and 5. Further, subframe 6 may be considered an anchor subframe because the downlink transmissions are partially aligned. The subframes that do not align (i.e., the subframes that change across different configurations) may be referred to as non-anchor subframes 904.

In another aspect of the present disclosure, the anchor subframes are determined based on only two configurations. Specifically, referring to FIG. 9B, the TDD uplink/downlink configurations 1 and 2 may be considered to determine the anchor subframes. Subframes 0, 1, 2, 4, 5, 6, 7, and 9 are common across configurations 1 and 2. Accordingly, these subframes are defined as the anchor subframes 902. The remaining subframes 3 and 8 are referred to as the non-anchor subframes 904.

In one aspect of the present disclosure, a first set of subframes that are common across different configurations may be defined as anchor subframes. In one configuration, the HARQ timing as well as ACK/NACK locations for the anchor subframes do not change. Additionally, a second set of subframes that may suffer interference may be defined as non-anchor subframes. The non-anchor subframes may adaptively change uplink and downlink directions (i.e., a downlink subframe may be changed to an uplink subframe, and vice versa). The non-anchor subframes may also include subframes that are different amongst cells (e.g., uplink in one cell and downlink in a neighboring cell). In one configuration, the HARQ timing and ACK/NACK locations may be changed for non-anchor subframes in the adaptive TDD case. Additionally or alternatively, the ACK/NACK locations may be changed depending on the interference level for the case when the subframes differ across cells. For example, in some cases, the ACK is not transmitted on an uplink subframe when the uplink subframe is changed to a downlink subframe.

Another aspect of the present disclosure is directed to signaling methods. In particular, anchor subframe information may be broadcast via the system information block (SIB) or signaled via radio resource control (RRC) messaging. The eNodeB signals the anchor subframe configurations to indicate the subframes that will not change directions. The anchor subframe information may or may not include detailed TDD configurations. Additionally, anchor subframe information may be exchanged via an interface between eNodeBs, such as the X2 interface or a fiber connection. Further, radio resource control (RRC) signaling or dynamic signaling may be specified to enable or disable non-anchor subframe options on a per UE basis.

In one example, the eNodeB may use bitmaps to indicate the anchor subframe configurations. When more than two configurations are specified, the indicated subframes are the subset of subframes that are fully aligned. When all seven configurations are specified, the indicated subframes are subframes 0, 1, 2, 5, 6. The subframe types may be differentiated based on common subframes and subframes that can dynamically change uplink/downlink directions.

Additionally, in one configuration, channel state information (CSI) reporting is separated according to the anchor subframe set and the non-anchor subframe set. For example, a first set of CSI reporting may be directed to the anchor subframe set and a second set of CSI reporting may be directed to the non-anchor subframe set. In another configuration, cross subframe scheduling may be specified. That is, the scheduling grants may be transmitted on the anchor subframes and cross subframe scheduling is used for the non-anchor subframe transmissions.

For adaptive TDD configurations, the anchor subframes indicate the subframes without downlink/uplink direction changes. In the case of different TDD configurations across different cells, the anchor subframes are subframes that do not experience eNodeB-to-eNodeB or UE-to-UE interference between adjacent cells. In one configuration, the eNodeB may determine whether to change a HARQ timeline based on the interference level. That is, in the case of an adaptive TDD configuration, the HARQ timeline is redefined for non-anchor subframes. In some cases, when the HARQ transmissions, (e.g., retransmission) or ACK are within anchor subframes, there is no change to the HARQ timeline before and after the adaptation. Alternatively, when the HARQ retransmissions or ACK are within the non-anchor subframes, the HARQ timeline is redesigned during the transition. For example, the ACK is moved into an anchor subframe when the new direction of transmission does not allow ACK transmission. In another configuration, the ACK is delayed until the next anchor subframe or bundled into the ACK scheduled on the next anchor subframe.

For different TDD configurations across cells, some of the subframes will experience interference. Still, due to their different geographical positions, not all UEs will have the same impact. For example, UEs on the far side of a serving cell, relative to an interfering cell, may be less impacted by the TDD uplink/downlink mismatch. Therefore, various signaling configurations may be implemented to leverage the varying amounts and profiles of interference experienced by the different UEs. Similarly, certain UEs may be capable of different levels of interference cancellation. Therefore, the signaling may be UE specific, or UE's may be grouped and signaled based on interference and/or interference cancelation capability.

Once identified, a UE experiencing interference may be signaled with the anchor subframes where UE-to-UE or eNodeB-to-eNodeB interference is expected. Furthermore, certain UEs may be signaled with the non-anchor subframes, where interference is not expected or not strong. The eNodeB may signal to a UE to enable or disable a new HARQ timeline for non-anchor subframes depending on the UE's location and interference level. Further, different UEs within a cell can be signaled with different anchor subframe configurations. For example, two UEs at different locations within a cell may experience uplink/downlink mismatches on different subframes due to different nearby interfering cells (or combinations of interfering cells). As such, these two UEs may be signaled with different anchor subframes by the same serving eNodeB.

In one configuration, one or more specific UEs, such as a low cost UE, a power saving UE, a high mobility UE, and/or a guaranteed service UE, may be configured to operate only on the common subframes. For example, the specific UEs may only operate on subframes 0, 1, 2, 5, and 6 so that the specific UEs are not affected by the adaptive TDD and intercell interference due to different TDD configurations.

The anchor subframe design provides individual TDD configuration signaling, where the eNodeB and UE treat each TDD configuration separately. Additionally, the anchor subframe based signaling and interference management scheme provide a common framework to signal subframes that do not change or do not suffer from interference compared to other subframes. Further, the anchor subframe design provides flexibility for the eNodeB to control what the UE assumes for HARQ transmissions or other reconfiguration issues.

Figure 10:
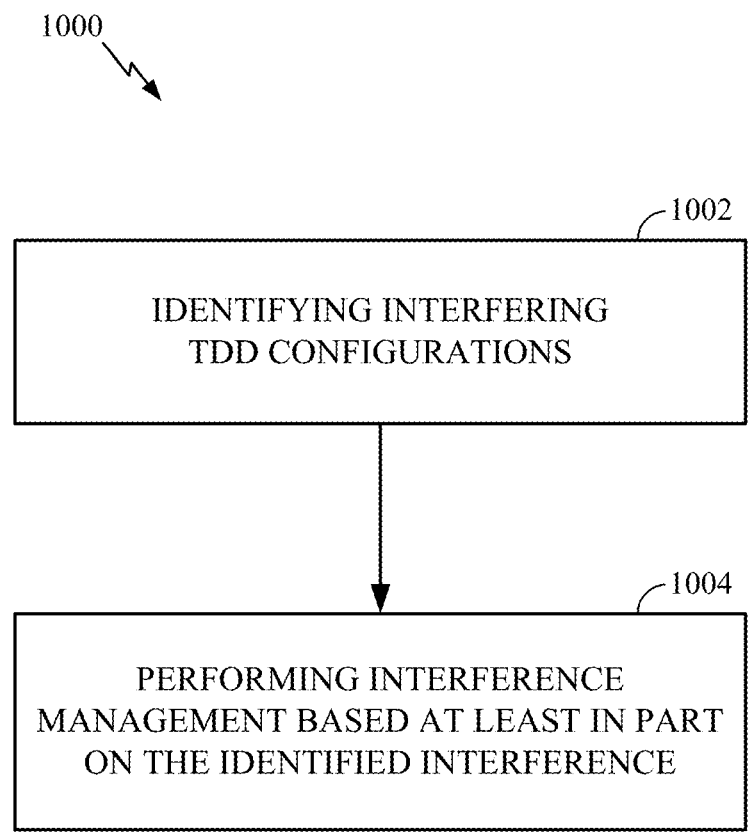
FIGS. 10-12 are block diagrams illustrating a method for mitigating interference according to an aspect of the present disclosure.

FIG. 10 illustrates a method 1000 for mitigating interference in a wireless network based on an aspect of the present disclosure.

In block 1002, an eNodeB identifies interfering TDD configurations. In one configuration, the eNodeB may identify the interfering TDD configurations based on a downlink signal of a neighboring eNodeB received during an uplink timeslot for a UE associated with the eNodeB. In another configuration, the eNodeB may user an energy detector for CRS and/or CSI-RS tones to identify the interfering TDD configuration.

In block 1004, the eNodeB performs interference management based at least in part on the identified interference. In one configuration, the interference management may include specifying different scheduling and/or power control for subframes that are mismatched based on the interfering TDD configuration. In another configuration, the interference management may include cancelling the downlink signal of the interfering eNodeB to detect the uplink signal of the UE. The downlink signal may include, for example, a physical broadcast channel, a CRS, a downlink control channel, and/or a shared channel.

Figure 11:
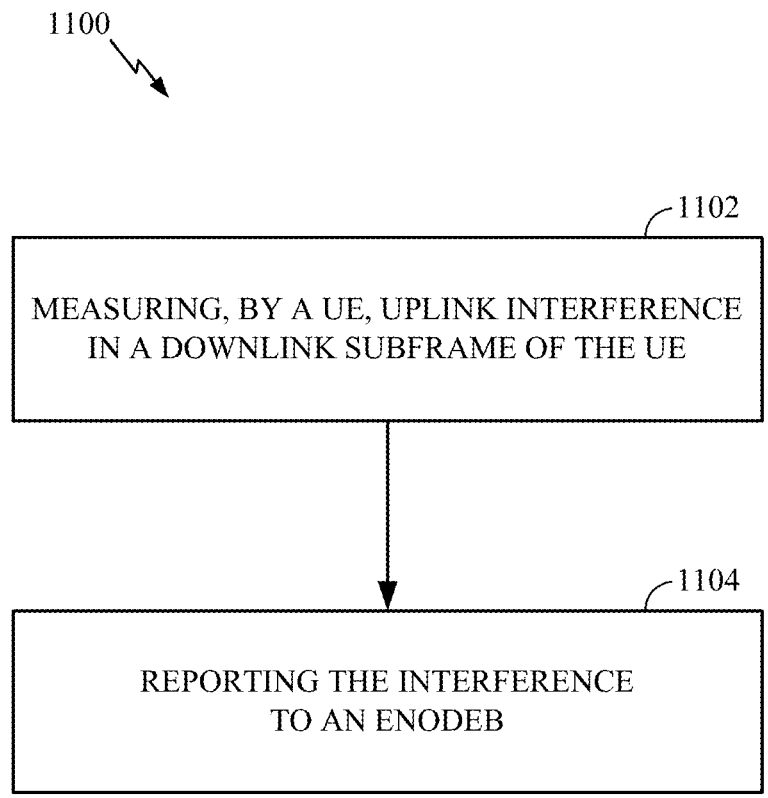

FIG. 11 illustrates a method 1100 for mitigating interference in a wireless network based on an aspect of the present disclosure.

In block 1102, a UE measures uplink interference in a downlink subframe. The interference may be caused by a neighboring UE. In one configuration, the interference source is the shared channel transmission of the neighboring UE.

In block 1104, the UE reports the interference to an eNodeB. In one configuration, after being notified of the interference, the eNodeB may adjust the scheduling of the UE. In another configuration, the UE may perform interference cancellation on the uplink signal of the neighboring UE. The uplink signal may be a shared uplink channel, an uplink control channel, a random access channel, and/or a sounding reference signal.

Figure 12:
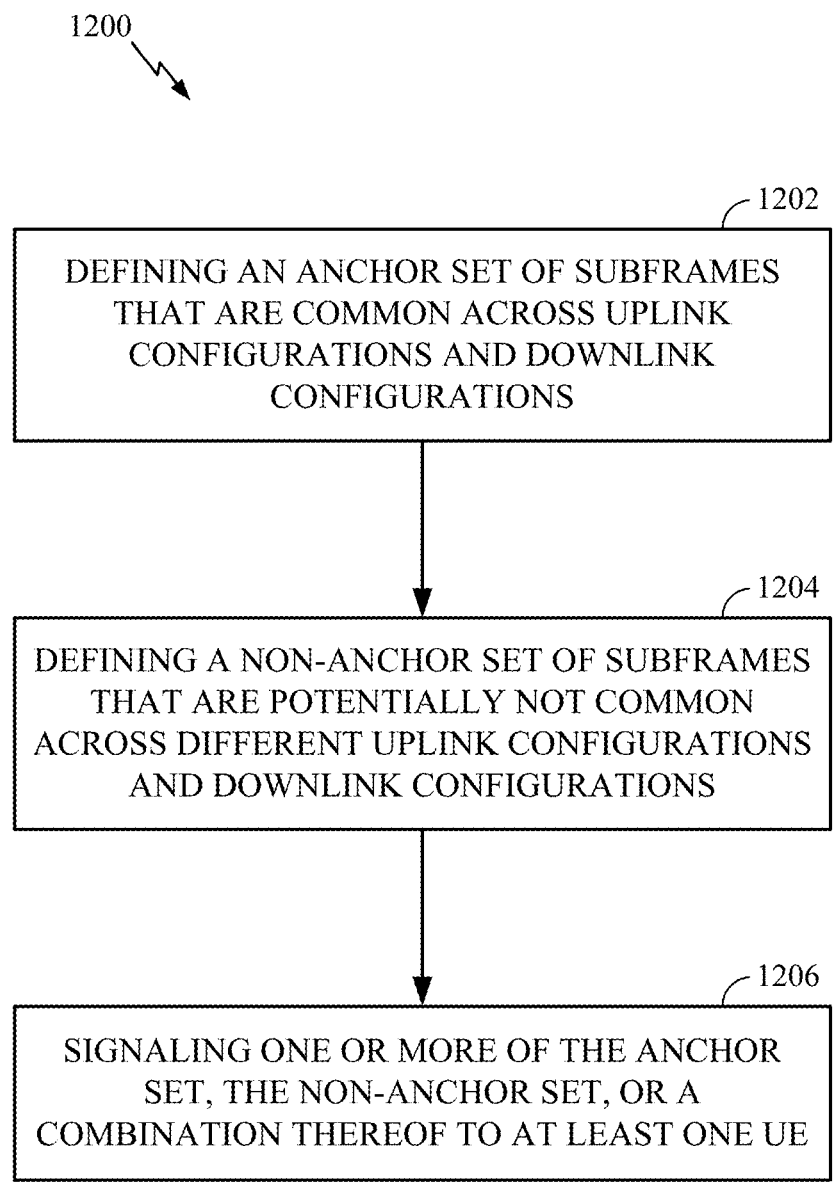

FIG. 12 illustrates a method 1200 for mitigating interference in a wireless network based on an aspect of the present disclosure.

In block 1202, an eNodeB defines an anchor set of subframes that are common across uplink configurations and downlink configurations. In one configuration, the HARQ timing and the ACK/NACK locations for the anchor subframes are not changed.

In block 1204, the eNodeB defines a non-anchor set of subframes that are potentially not common across different uplink configurations and downlink configurations. In one configuration, the HARQ timing and ACK/NACK locations for the non-anchor subframes are changed for adaptive TDD configurations and/or based on an interference level. The anchor set of subframes and the non-anchor set of subframes may be selected from all possible TDD configurations or only the TDD configurations specified for a specific network/system.

In block 1206, the eNodeB signals one or more of the anchor set, the non-anchor set, or a combination thereof to at least one UE. The signaling may be SIB or RRC signaling. The signaling may include detailed TDD configuration information, and may be broadcast or unicast as a bitmap or an index value.

Figure 13:
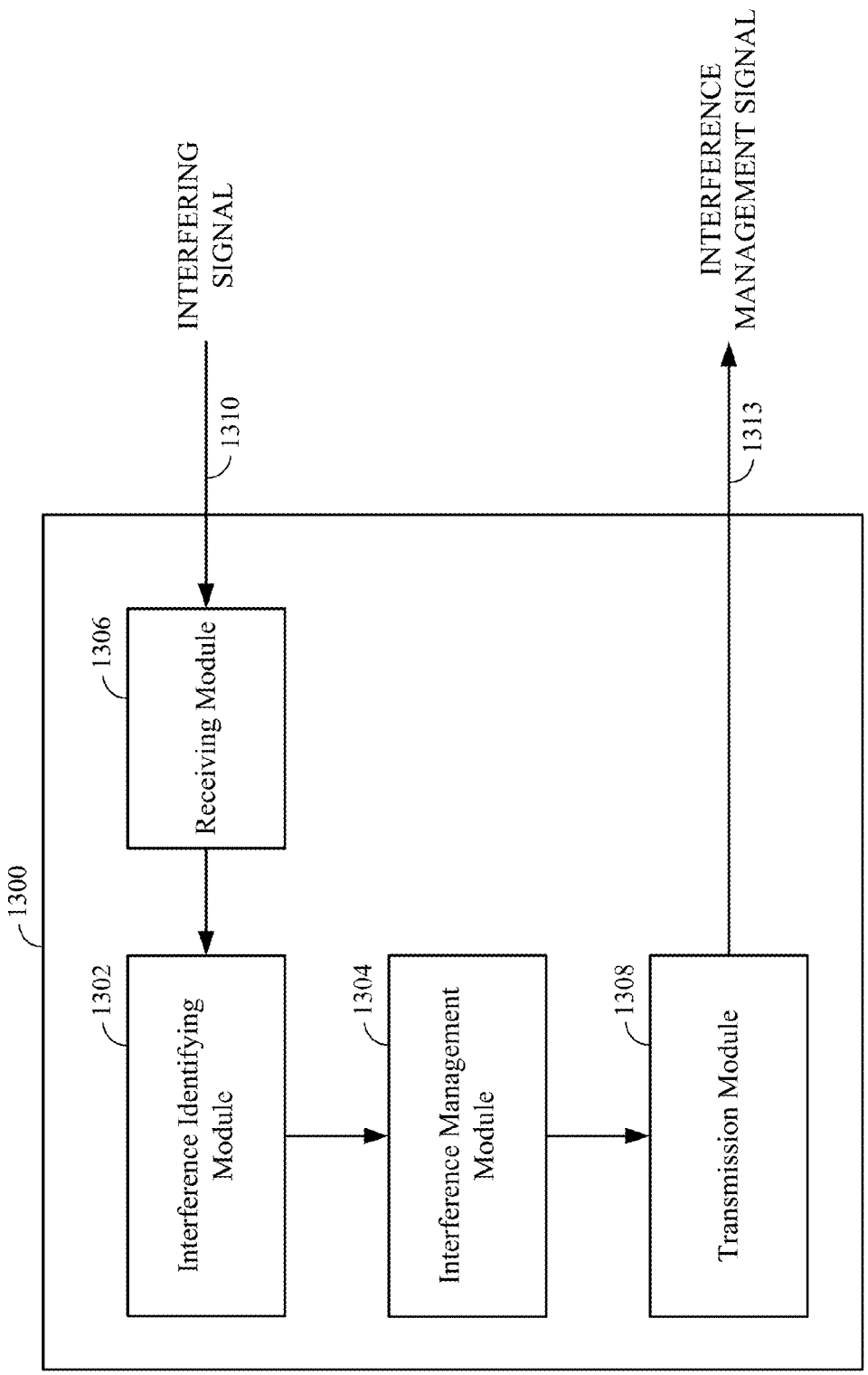
FIGS. 13-15 are conceptual data flow diagrams illustrating data flows between different modules/means/components in an exemplary apparatus.

FIG. 13 is a conceptual data flow diagram illustrating the data flow between different modules/means/components in an exemplary apparatus 1300. The apparatus 1300 includes an interference identifying module 1302 that identifies interfering TDD configurations. The interference may result from a mismatch between an uplink communication of a first base station and a downlink communication of a second base station. The interference identifying module 1302 may receive a downlink transmission of an interfering eNodeB during an uplink timeslot of a UE. The downlink transmission may be received via the signal 1310 received at the receiving module 1306. In one configuration, the receiving module 1306 may notify the interference identifying module 1302 that the downlink transmission has been received. In another configuration, the receiving module 1306 communicates the downlink transmission to the interference identifying module 1302.

The apparatus 1300 also includes an interference management module 1304 that manages the identified interference. As previously discussed, in one configuration, the interference management module may specify different scheduling and/or power control for subframes that are mismatched based on the interfering TDD configuration. In another configuration, the interference management module may cancel the downlink signal of the interfering eNodeB to detect the uplink signal of the UE. That is, the interference management module 1304 may use the transmission module 1308 to transmit a signal 1313 to manage the interference. The signal 1313 may cancel the downlink interference and/or control subframe scheduling and/or power. The apparatus may include additional modules that perform each of the steps of the process in the aforementioned flow chart of FIG. 10. As such, each step in the aforementioned flow chart FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
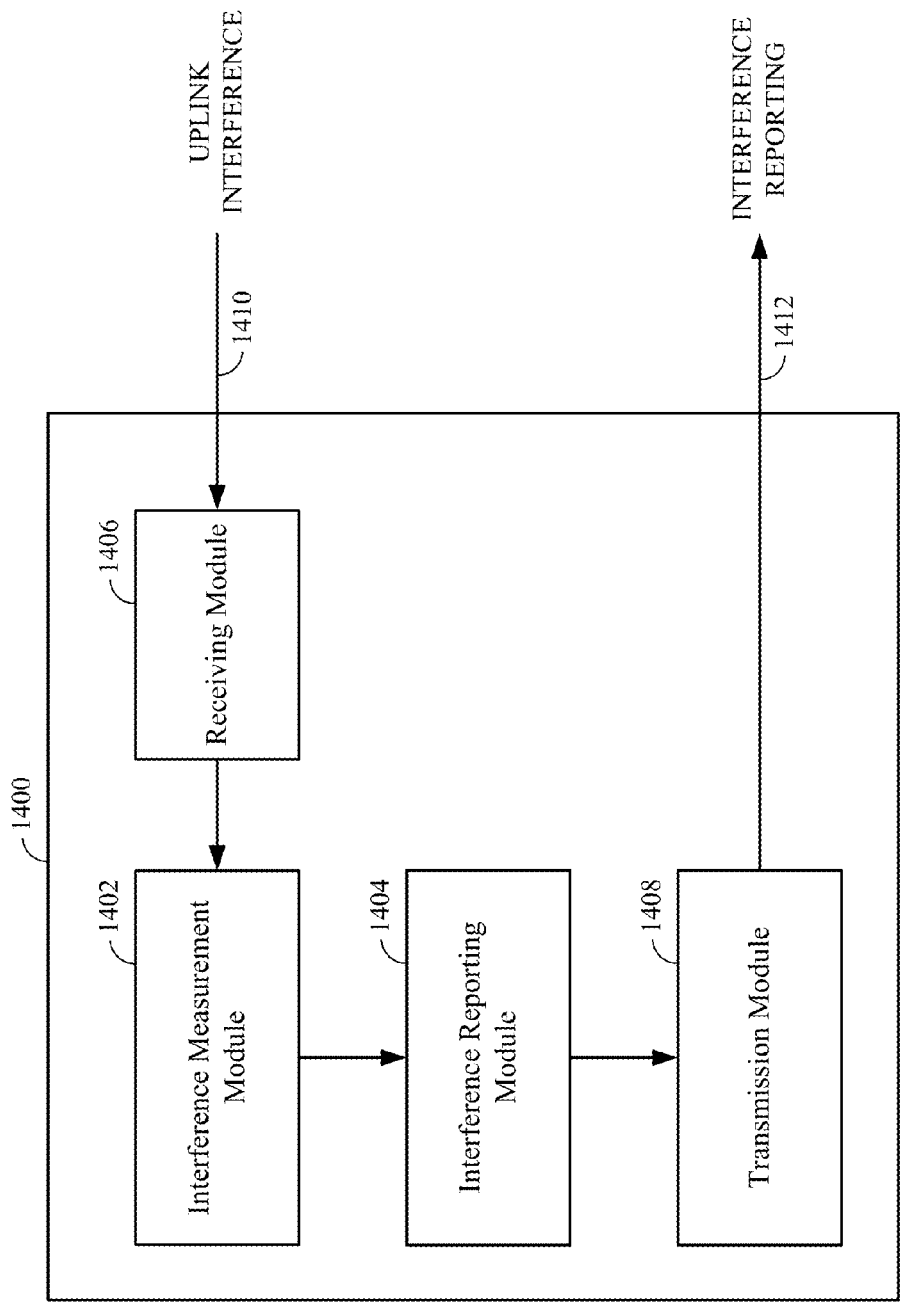

FIG. 14 is a conceptual data flow diagram illustrating the data flow between different modules/means/components in an exemplary apparatus 1400. The apparatus 1400 includes an interference measurement module 1402 that measures uplink interference in a downlink subframe of the UE. The interference measurement module 1402 may receive a downlink transmission of an interfering UE during a downlink timeslot of a UE. The uplink transmission may be received via the signal 1410 received at the receiving module 1406. In one configuration, the receiving module 1406 may notify the interference measurement module 1402 that the uplink transmission has been received. In another configuration, the receiving module 1406 communicates the uplink transmission received via signal 1410 to the interference measurement module 1402.

The apparatus 1400 also includes an interference reporting module 1404 that reports the identified interference to an eNodeB. Specifically, the interference reporting module 1404 may use the transmission module 1408 to transmit a signal 1412 to report the interference to the eNodeB. The apparatus may include additional modules that perform each of the steps of the process in the aforementioned flow chart of FIG. 11. As such, each step in the aforementioned flow chart FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
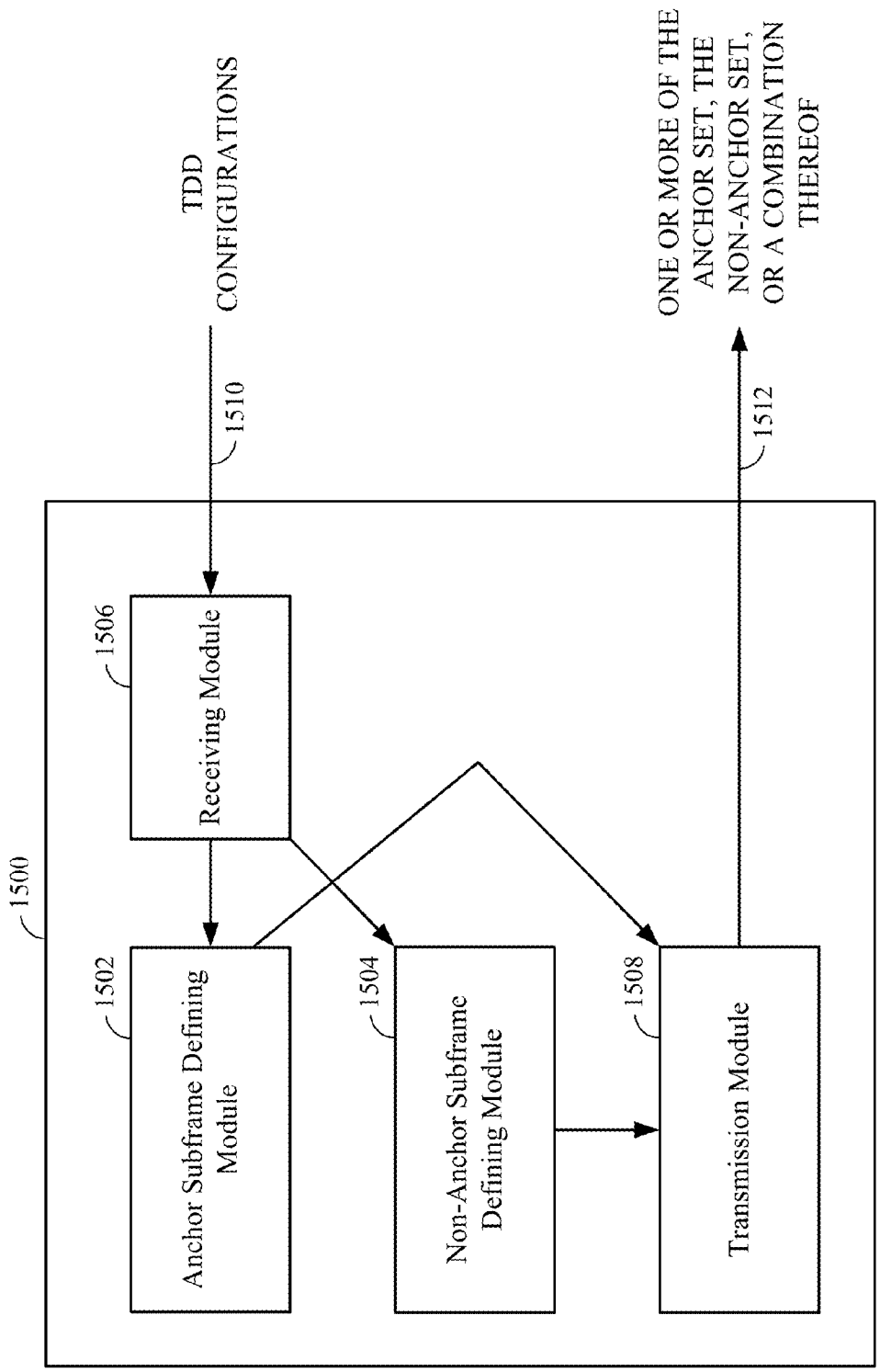

FIG. 15 is a conceptual data flow diagram illustrating the data flow between different modules/means/components in an exemplary apparatus 1500. The apparatus 1500 includes an anchor subframe defining module 1502 that defines an anchor set of subframes that are common across uplink configurations and downlink configurations (e.g., TDD configurations). The apparatus 1500 also includes an non-anchor subframe defining module 1504 that defines a non-anchor set of subframes that are potentially not common across different uplink configurations and downlink configurations (e.g., TDD configurations).

The anchor subframe defining module 1502 and/or non-anchor subframe defining module 1504 may be informed of the TDD configurations of a specific network based on a signal 1510 received at the receiving module 1506. In one configuration, the receiving module 1506 may notify the anchor subframe defining module 1502 and/or the non-anchor subframe defining module 1504 of the TDD configurations. In another configuration, the receiving module 1506 communicates the TDD configurations received via signal 1510 to the anchor subframe defining module 1502 and/or the non-anchor subframe defining module 1504.

Additionally, the transmission module 1508 may be specified to transmit a signal 1512 to signal one or more of the anchor set, and the non-anchor set to at least one UE. The transmission module 1508 may be notified of the non-anchor set and/or the anchor set directly from each of the anchor subframe defining module 1502 and the non-anchor subframe defining module 1504. The apparatus may include additional modules that perform each of the steps of the process in the aforementioned flow chart of FIG. 12. As such, each step in the aforementioned flow chart FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
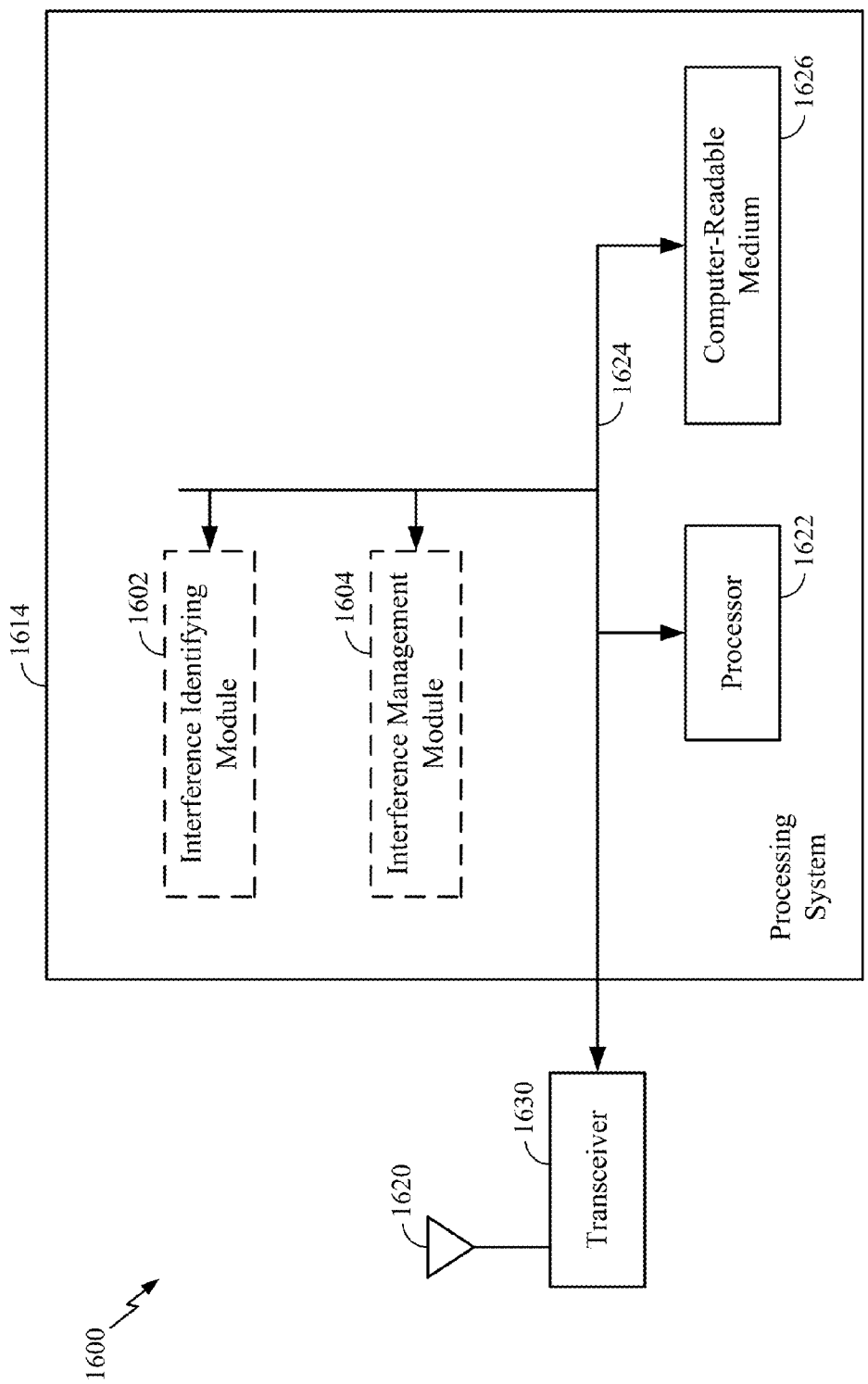
FIGS. 16-18 are block diagrams illustrating different modules/means/components in an exemplary apparatus.

FIG. 16 is a diagram illustrating an example of a hardware implementation for an apparatus 1600 employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1622 the modules 1602, 1604 and the computer-readable medium 1626. The bus 1624 may also link various other circuits such as timing sources, peripherals, voltage regulators, and power management circuits, which are well known in the art, and therefore, will not be described any further.

The apparatus includes a processing system 1614 coupled to a transceiver 1630. The transceiver 1630 is coupled to one or more antennas 1620. The transceiver 1630 enables communicating with various other apparatus over a transmission medium. The processing system 1614 includes a processor 1622 coupled to a computer-readable medium 1626. The processor 1622 is responsible for general processing, including the execution of software stored on the computer-readable medium 1626. The software, when executed by the processor 1622, causes the processing system 1614 to perform the various functions described for any particular apparatus. The computer-readable medium 1626 may also be used for storing data that is manipulated by the processor 1622 when executing software.

The processing system 1614 includes an interference identifying module 1602 for identifying interfering time division duplexing (TDD) configurations. The processing system 1614 also includes an interference management module 1604 for performing interference management based at least in part on the identified interference. The modules may be software modules running in the processor 1622, resident/stored in the computer-readable medium 1626, one or more hardware modules coupled to the processor 1622, or some combination thereof. The processing system 1614 may be a component of the UE 650 and may include the memory 660, and/or the controller/processor 659.

Figure 17:
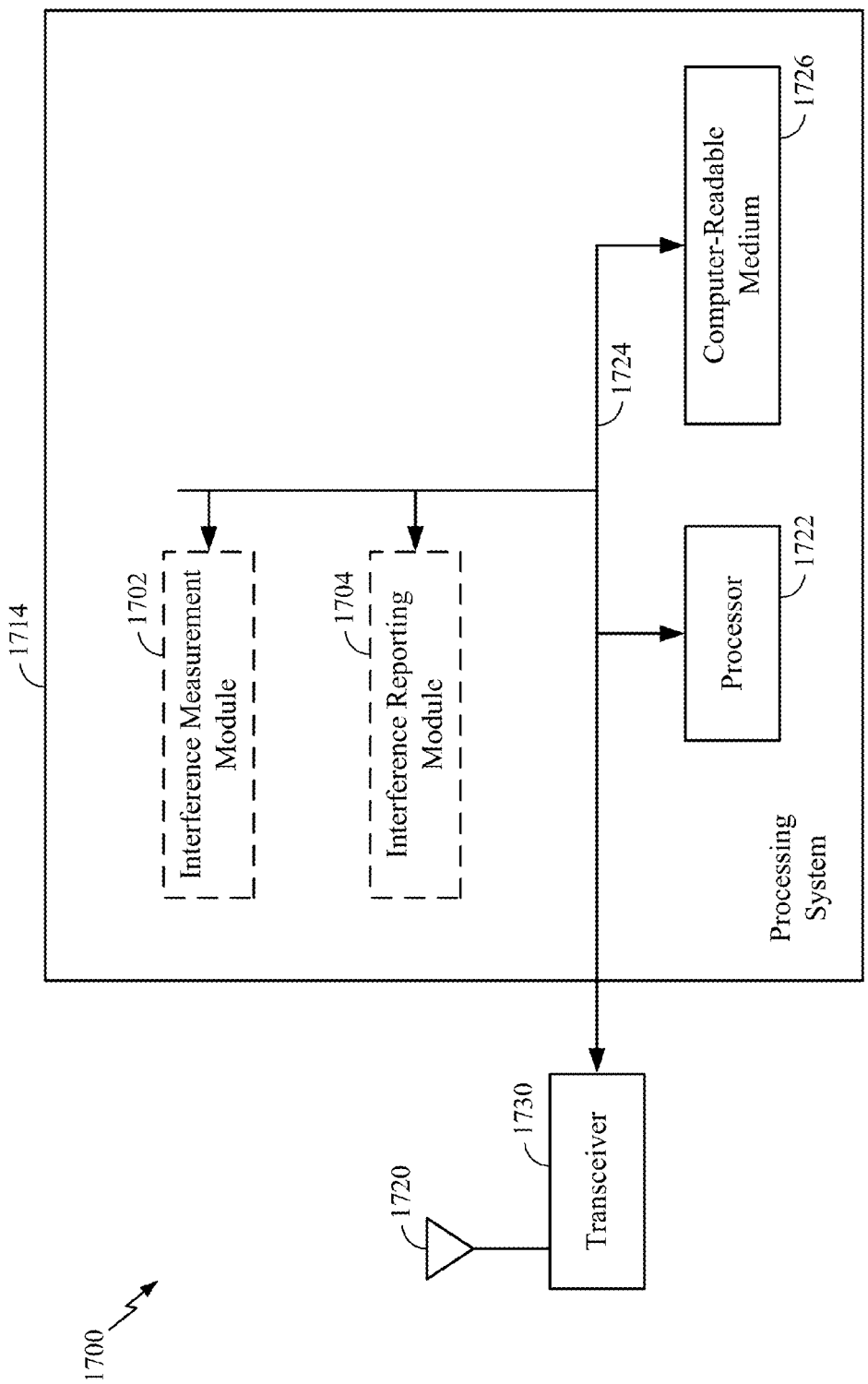

FIG. 17 is a diagram illustrating an example of a hardware implementation for an apparatus 1700 employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1722 the modules 1702, 1704 and the computer-readable medium 1726. The bus 1724 may also link various other circuits such as timing sources, peripherals, voltage regulators, and power management circuits, which are well known in the art, and therefore, will not be described any further.

The apparatus includes a processing system 1714 coupled to a transceiver 1730. The transceiver 1730 is coupled to one or more antennas 1720. The transceiver 1730 enables communicating with various other apparatus over a transmission medium. The processing system 1714 includes a processor 1722 coupled to a computer-readable medium 1726. The processor 1722 is responsible for general processing, including the execution of software stored on the computer-readable medium 1726. The software, when executed by the processor 1722, causes the processing system 1714 to perform the various functions described for any particular apparatus. The computer-readable medium 1726 may also be used for storing data that is manipulated by the processor 1722 when executing software.

The processing system 1714 includes an interference measurement module 1702 for measuring, by a UE, uplink interference in a downlink subframe of the UE. The processing system 1714 also includes an interference reporting module 1704 for reporting the identified interference to an eNodeB. The modules may be software modules running in the processor 1722, resident/stored in the computer-readable medium 1726, one or more hardware modules coupled to the processor 1722, or some combination thereof. The processing system 1714 may be a component of the UE 650 and may include the memory 660, and/or the controller/processor 659.

Figure 18:
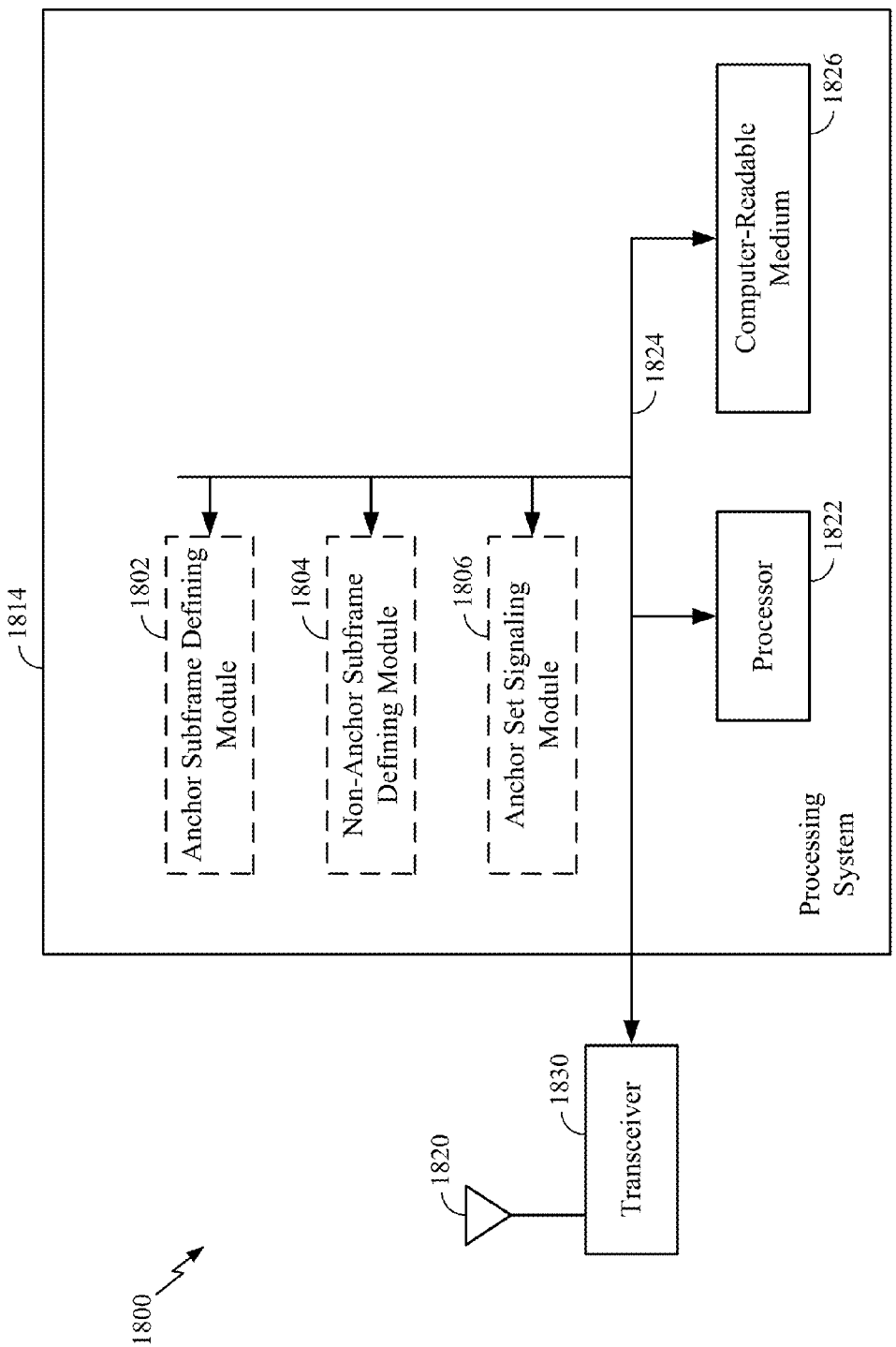

FIG. 18 is a diagram illustrating an example of a hardware implementation for an apparatus 1800 employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1822 the modules 1802, 1804, 1806 and the computer-readable medium 1826. The bus 1824 may also link various other circuits such as timing sources, peripherals, voltage regulators, and power management circuits, which are well known in the art, and therefore, will not be described any further.

The apparatus includes a processing system 1814 coupled to a transceiver 1830. The transceiver 1830 is coupled to one or more antennas 1820. The transceiver 1830 enables communicating with various other apparatus over a transmission medium. The processing system 1814 includes a processor 1822 coupled to a computer-readable medium 1826. The processor 1822 is responsible for general processing, including the execution of software stored on the computer-readable medium 1826. The software, when executed by the processor 1822, causes the processing system 1814 to perform the various functions described for any particular apparatus. The computer-readable medium 1826 may also be used for storing data that is manipulated by the processor 1822 when executing software.

The processing system 1814 includes an anchor subframe defining module 1802 for defining an anchor set of subframes that are common across a plurality of uplink configurations and downlink configurations. The processing system 1814 also includes a non-anchor subframe defining module 1804 for defining a non-anchor set of subframes that are potentially not common across different uplink configurations and downlink configurations. The processing system 1814 may further include an anchor set signaling module 1806 for signaling one or more of the anchor set, the non-anchor set, or a combination thereof to at least one UE. The modules may be software modules running in the processor 1822, resident/stored in the computer-readable medium 1826, one or more hardware modules coupled to the processor 1822, or some combination thereof. The processing system 1814 may be a component of the UE 650 and may include the memory 660, and/or the controller/processor 659.

In one configuration, the eNodeB 610 is configured for wireless communication including means for identifying interference. In one configuration, the interference identifying means may be the controller/processor 675, memory 676, receive processor 670, demodulators 618, and/or antenna 620, configured to perform the functions recited by the interference identifying means. The eNodeB 610 is also configured to include a means for managing the interference. In one aspect, the interference management means may be the controller/processor 675, memory 676, transmit processor 616, modulators 618, and/or antenna 620 configured to perform the functions recited by the interference management means. In another configuration, the aforementioned means may be any module or any apparatus configured to perform the functions recited by the aforementioned means.

In one configuration, the UE 650 is configured for wireless communication including means for measuring interference. In one aspect, the interference measuring means may be the controller/processor 659, memory 660, receive processor 656, modulators 654, and/or antenna 652 configured to perform the functions recited by the interference measuring means. The UE 650 is also configured for wireless communication including means for reporting the measured interference. In one configuration, the interference reporting means may be the controller/processor 659, memory 660, modulators 654, antenna 652, and/or transmit processor 668 configured to perform the functions recited by the interference reporting means. In another configuration, the aforementioned means may be any module or any apparatus configured to perform the functions recited by the aforementioned means.

In one configuration, the eNodeB 610 is configured for wireless communication including means for defining anchor subframe sets and non-anchor subframes sets. In one configuration, the anchor subframe set and non-anchor subframes set defining means may be the controller/processor 675, memory 646, receive processor 670, demodulators 618, and/or antenna 620 configured to perform the functions recited by the anchor subframe set and non-anchor subframes set defining. The eNodeB 610 is also configured to include a means for signaling the anchor subframe sets and/or non-anchor subframe sets. In one aspect, the anchor subframe set and/or non-anchor subframe set signaling means may be the controller/processor 675, memory 646, transmit processor 616, modulators 618, and/or antenna 620 configured to perform the functions recited by the anchor subframe set and/or non-anchor subframe set signaling means. In another configuration, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For purposes of disclosure, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed:

1. A method for mitigating interference in a wireless network, comprising:
   identifying, at a base station, an interfering time division duplexing (TDD) configuration;
   scheduling, by the base station, a first channel state information (CSI) report for non-anchor subframes common to a first TDD configuration and the interfering TDD configuration;
   scheduling, by the base station, a second CSI report for anchor subframes common to the first TDD configuration and the interfering TDD configuration;
   identifying, at the base station, interference resulting from a mismatch between a first non-anchor subframe of the first TDD configuration and a second non-anchor subframe of the interfering TDD configuration based at least in part on the first CSI report and the second CSI report; and
   performing, at the base station, interference management by modifying at least one of a modulation and coding scheme (MCS), power control, or a combination thereof for the first non-anchor subframe.

2. The method of claim 1, in which the interference management further comprises avoiding the identified interference or canceling the identified interference.

3. The method of claim 2, in which cancelling the identified interference comprises cancelling an interfering downlink signal when receiving an intended uplink signal.

4. The method of claim 1, in which:
identifying the interfering TDD configuration comprises detecting a downlink signal during an uplink transmission in the first non-anchor subframe of the base station; and
the interference management further comprises modifying scheduling of a served user equipment (UE).

5. The method of claim 1, in which identifying the interfering TDD configuration comprises detecting an energy of common reference signal (CRS) tones or channel state information reference signal (CSI-RS) tones.

6. The method of claim 1, in which the identifying the interfering TDD configuration comprises receiving signaling from a served user equipment (UE), the signaling notifying the base station of UE-to-UE interference.

7. A base station for wireless communications, comprising:
a memory; and
at least one processor coupled to the memory, the at least one processor being configured:
to identify an interfering time division duplexing (TDD) configuration;
to schedule a first channel state information (CSI) report for non-anchor subframes common to a first TDD configuration and the interfering TDD configuration;
to schedule a second CSI report for anchor subframes common to the first TDD configuration and the interfering TDD configuration;
to identify interference resulting from a mismatch between a first non-anchor subframe of the first TDD configuration and a second non-anchor subframe of the interfering TDD configuration based at least in part on the first CSI report and the second CSI report; and
to perform interference management by modifying at least one of a modulation and coding scheme (MCS), power control, or a combination thereof for the first non-anchor subframe.

8. The base station of claim 7, in which the at least one processor is further configured to avoid the identified interference or to cancel the identified interference.

9. The base station of claim 8, in which the at least one processor is further configured to cancel an interfering downlink signal when receiving an intended uplink signal.

10. The base station of claim 7, in which the at least one processor is further configured:
to identify the interfering TDD configuration by detecting a downlink signal during an uplink transmission in the first non-anchor subframe of the base station; and
to modify scheduling of a served user equipment (UE).

11. The base station of claim 7, in which the at least one processor is further configured to identify the interfering TDD configuration by detecting an energy of common reference signal (CRS) tones or channel state information reference signal (CSI-RS) tones.

12. The base station of claim 7, in which the at least one processor is further configured to identify the interfering TDD configuration by receiving signaling from a served user equipment (UE), the signaling notifying the base station of UE-to-UE interference.

13. An apparatus for wireless communications, comprising:
means for identifying, at a base station, an interfering time division duplexing (TDD) configuration;
means for scheduling, by the base station, a first channel state information (CSI) report for non-anchor subframes common to a first TDD configuration and the interfering TDD configuration;
means for scheduling, by the base station, a second CSI report for anchor subframes common to the first TDD configuration and the interfering TDD configuration;
means for identifying, at the base station, interference resulting from a mismatch between a first non-anchor subframe of the first TDD configuration and a second non-anchor subframe of the interfering TDD configuration based at least in part on the first CSI report and the second CSI report; and
means for performing, at the base station, interference management by modifying at least one of a modulation and coding scheme (MCS), power control, or a combination thereof for the first non-anchor subframe.

14. A non-transitory computer-readable medium having program code recorded thereon for wireless communication, the program code comprising:
program code to identify, at a base station, an interfering time division duplexing (TDD) configuration;
program code to schedule, by the base station, a first channel state information (CSI) report for non-anchor subframes common to a first TDD configuration and the interfering TDD configuration;
program code to schedule, by the base station, a second CSI report for anchor subframes common to the first TDD configuration and the interfering TDD configuration;
program code to identify, at the base station, interference resulting from a mismatch between a first non-anchor subframe of the first TDD configuration and a second non-anchor subframe of the interfering TDD configuration based at least in part on the first CSI report and the second CSI report; and
program code to perform, at the base station, interference management by modifying at least one of a modulation and coding scheme (MCS), power control, or a combination thereof for the first non-anchor subframe.

* * * * *